United States Patent
Huang

(10) Patent No.: US 12,015,564 B2
(45) Date of Patent: Jun. 18, 2024

(54) NETWORK MANAGEMENT METHOD AND NETWORK ENTITY

(71) Applicant: Wistron Corporation, New Taipei (TW)

(72) Inventor: Yuan Fu Huang, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 18/167,085

(22) Filed: Feb. 10, 2023

(65) Prior Publication Data

US 2024/0146665 A1 May 2, 2024

(30) Foreign Application Priority Data

Nov. 1, 2022 (TW) .................................. 111141673

(51) Int. Cl.
*H04L 47/70* (2022.01)
*H04L 47/76* (2022.01)
*H04W 36/14* (2009.01)

(52) U.S. Cl.
CPC .............. *H04L 47/70* (2013.01); *H04L 47/76* (2013.01); *H04W 36/14* (2013.01)

(58) Field of Classification Search
CPC ... H04L 47/70; H04L 63/1416; H04L 63/101; H04L 41/0663; H04L 47/76; H04W 36/14
See application file for complete search history.

(56) References Cited

U.S. PATENT DOCUMENTS

| 11,451,984 | B2 | 9/2022 | Tsai et al. | |
|---|---|---|---|---|
| 11,722,928 | B1* | 8/2023 | Marupaduga | H04W 36/13 370/329 |
| 2020/0005644 | A1* | 1/2020 | Ichimaru | G08G 1/096775 |
| 2022/0148115 | A1* | 5/2022 | Fang | G06V 20/17 |
| 2022/0150723 | A1* | 5/2022 | Tsai | H04W 28/08 |
| 2023/0276392 | A1* | 8/2023 | Ianev | H04W 60/00 455/435.1 |
| 2023/0284111 | A1* | 9/2023 | Nobe | H04W 36/36 370/331 |
| 2023/0300732 | A1* | 9/2023 | Wang | H04W 24/08 370/329 |

FOREIGN PATENT DOCUMENTS

TW I740713 9/2021

OTHER PUBLICATIONS

"Office Action of Taiwan Counterpart Application", dated Mar. 13, 2023, p. 1-p. 12.

* cited by examiner

*Primary Examiner* — Jungwon Chang
(74) *Attorney, Agent, or Firm* — JCIPRNET

(57) ABSTRACT

A network management method and a network entity are provided. In the method, a detection result is obtained. One of multiple network slices is switched to another according to the detection result. The detection result is a result of detecting an image. Each network slice provides a network resource. The image is accessed through the network resource. Accordingly, a network setting parameter could be dynamically adjusted to save energy.

18 Claims, 6 Drawing Sheets

NETWORK MANAGEMENT METHOD AND NETWORK ENTITY

CROSS-REFERENCE TO RELATED APPLICATION

This application claims the priority benefit of Taiwan application serial no. 111141673, filed on Nov. 1, 2022. The entirety of the above-mentioned patent application is hereby incorporated by reference herein and made a part of this specification.

BACKGROUND

Technical Field

This disclosure relates to a communication technology, and in particular to a network management method and a network entity.

Description of Related Art

Intelligent monitoring systems can provide multi-stage detection for different situations and are suitable for applications such as fall detection, crime detection, campus security, site security, and production line monitoring. However, monitoring systems usually operate in a fixed network bandwidth environment. As a result, the network power is maintained at a specific power level, thus consuming energy.

SUMMARY

Embodiments of the disclosure provide a network management method and a network entity, capable of dynamically adjusting a network resource according to a detection result, thereby saving energy and power.

The network management method according to the embodiments of the disclosure includes (but not limited to) the following steps. A detection result is obtained. One of multiple network slices is switched to another according to the detection result. The detection result is a result of detecting an image. Each of the network slices provides a network resource. The image is accessed through the network resource.

The network entity according to the embodiments of the disclosure include (but not limited to) a communication transceiver, a memory, and a processor. The communication transceiver transmits or receives a signal. The memory stores a program code. The processor is coupled to the communication transceiver and the memory. The processor loads the program code for obtaining a detection result and switching one of multiple network slices to another according to the detection result. The detection result is a result of detecting an image. Each of the network slices provides a network resource. The image is accessed through the network resource.

Based on the above, the network management method and the network entity according to the embodiments of the disclosure may switch to another network slice according to the detection result of the image. In this way, the network resource may be dynamically adjusted according to the demand, thus saving power.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
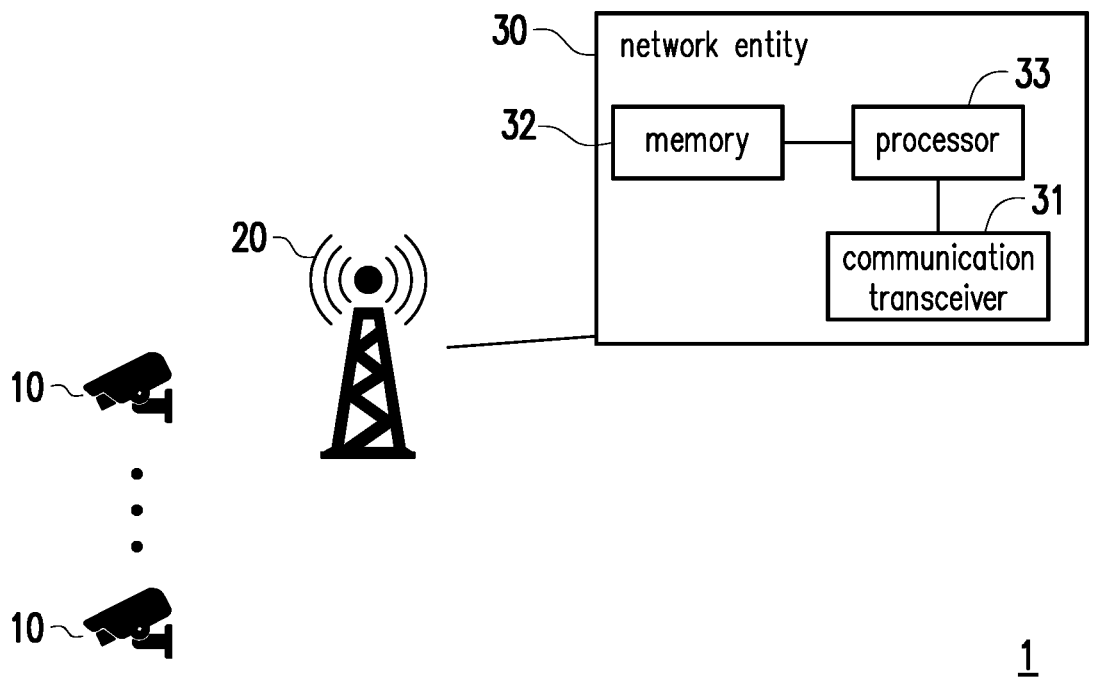
FIG. 1 is a schematic diagram of a system according to an embodiment of the disclosure.

FIG. 1 is a schematic diagram of a system 1 according to an embodiment of the disclosure. Referring to FIG. 1, the system 1 includes (but not limited to) one or more terminal devices 10, one or more base stations 20, and one or more network entities 30.

The terminal device 10 may be a webcam, a monitor, a smart phone, a tablet, a smart assistant device, an in-vehicle vehicle system, or a roadside unit (RSU). In one embodiment, the terminal device 10 includes an image capturing device (not shown, and for example a video camera or a camera), and is configured to capture images. In one embodiment, the terminal device 10 includes a communication transceiver (not shown, and supporting, for example, fourth generation (4G), fifth generation (5G), or other generations of mobile networks), and is configured to transmit images or other signals.

The base station 20 may be a Home evolved Node B (HeNB), eNB, next generation Node B (gNB), base transceiver system (BTS), relay, or repeater. In one embodiment, the base station 20 is used to provide network services to the terminal device 10.

The network entity 30 may be a core network entity, a network controller, a desktop computer, a server of any type, a workstation, or a backend host.

The network entity 30 includes (but not limited to) a communication transceiver 31, a memory 32, and a processor 33.

The communication transceiver 31 may be a wireless transceiver on one or more antennas, receivers, transmitters, analog-to-digital or digital-to-analog converters, or may be a transmission interface between base stations or network entities 30 (e.g., Ethernet or fiber optic network). In one embodiment, the communication transceiver 31 is configured to transmit data to or receive data from other devices.

The memory 32 may be any type of fixed or removable random access memory (RAM), read-only memory (ROM), flash memory, or similar elements or a combination of the above elements. In one embodiment, the memory 32 stores a program code, device configuration, codebook, buffered or permanent data, and a protocol-specific associated software module.

The processor 33 is coupled to the communication transceiver 31 and the memory 32. The processor 33 is configured to process digital signals and to execute programs according to exemplary embodiments of the disclosure, and may access or load the data and the software module stored in the memory 32. In one embodiment, functions of the processor 33 may be implemented by using a programmable unit such as a central processing unit (CPU), a microprocessor, a microcontroller, a digital signal processing (DSP) chip, a field programmable gate array (FPGA). In one embodiment, the functions of the processor 33 may also be implemented by using a stand-alone electronic device or an integrated circuit (IC). In one embodiment, an operation of the processor 33 may also be implemented in software.

In the following, the method according to the embodiment of the disclosure is described with each device and/or element of the system 1. Each process of the method according to the embodiment of the disclosure may be adapted to the circumstances of implementation and is not limited thereto.

Figure 2:
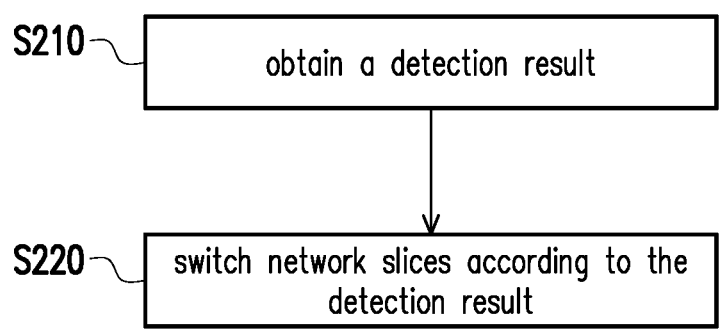
FIG. 2 is a flowchart of a network management method according to an embodiment of the disclosure.

FIG. 2 is a flowchart of a network management method according to an embodiment of the disclosure. Referring to FIG. 2, the processor 33 of the network entity 30 obtains a detection result (step S210). Specifically, the detection result is a result of detecting an image. In one embodiment, the image is derived from the terminal device 10. For example, the image capturing device of the terminal device 10 records or photographs a specified environment (e.g., a factory, a hospital, or a shopping mall) at regular or irregular intervals to obtain images. The base station may obtain the images from the terminal device 10 and transmit them to the network entity 30 through the Internet, a local area network, or a private network.

In one embodiment, the processor 33 may obtain the detection result based on object detection techniques. The object detection techniques are, for example, neural network-based algorithms (e.g., YOLO (You only look once), region based convolutional neural networks (R-CNN), or a fast R-CNN, or Fast R-CNN (Fast CNN)) or feature matching-based algorithms (e.g., feature matching of histogram of oriented gradient (HOG), scale-invariant feature transform (SIFT), Harr, or speeded up robust features (SURF)), but not limited thereto.

Depending on the requirements, the processor 33 may detect presence of a target object (e.g., a person, a weapon, or a vehicle) in the image, or the processor 33 may detect an occurrence of a target event in the image (e.g., a person picking up merchandise, a person holding a knife, or a vehicle breaking into a no-parking zone). However, the contents of the target object and the target event may still be changed according to actual needs, and there is no limitation to the embodiments of the disclosure. In other embodiments, the processor 33 may also obtain the detection results determined by other computing devices directly through the communication transceiver 31.

The processor 33 may switch one of multiple network slices to another according to the detection result (step S220). Specifically, 5G network slicing technology may provide different network resources for different services. The network slicing feature enables network optimization for intelligent monitoring systems, which may be applied to different stages of the monitoring system's network requirements to achieve power, bandwidth, and/or latency savings.

The system 1 may form an intelligent monitoring system. The intelligent monitoring system may provide multi-stage monitoring. For example, three stages include Monitoring, Insight, and Enforcement.

Each of the network slices provides a network resource/function. In the embodiment of the disclosure, the network resource/function may be used to obtain the images from the terminal device 10 in a radio access network (RAN). In other words, the images may be accessed through the network resource/function. In one embodiment, the processor 33 may define/set the network resource corresponding to the each of the network slices using an inference model (e.g., deep neural network (DNN), multi-layer perceptron (MLP), support vector machine (SVM), or other machine learning models). The network resources are, for example, bandwidth, latency, and/or priority. Machine learning algorithms may analyze training samples to obtain patterns from the training samples, and then predict unknown data through the patterns. The inference model is a machine learning model that is constructed after learning and is used to make inferences about data to be evaluated.

Figure 3:
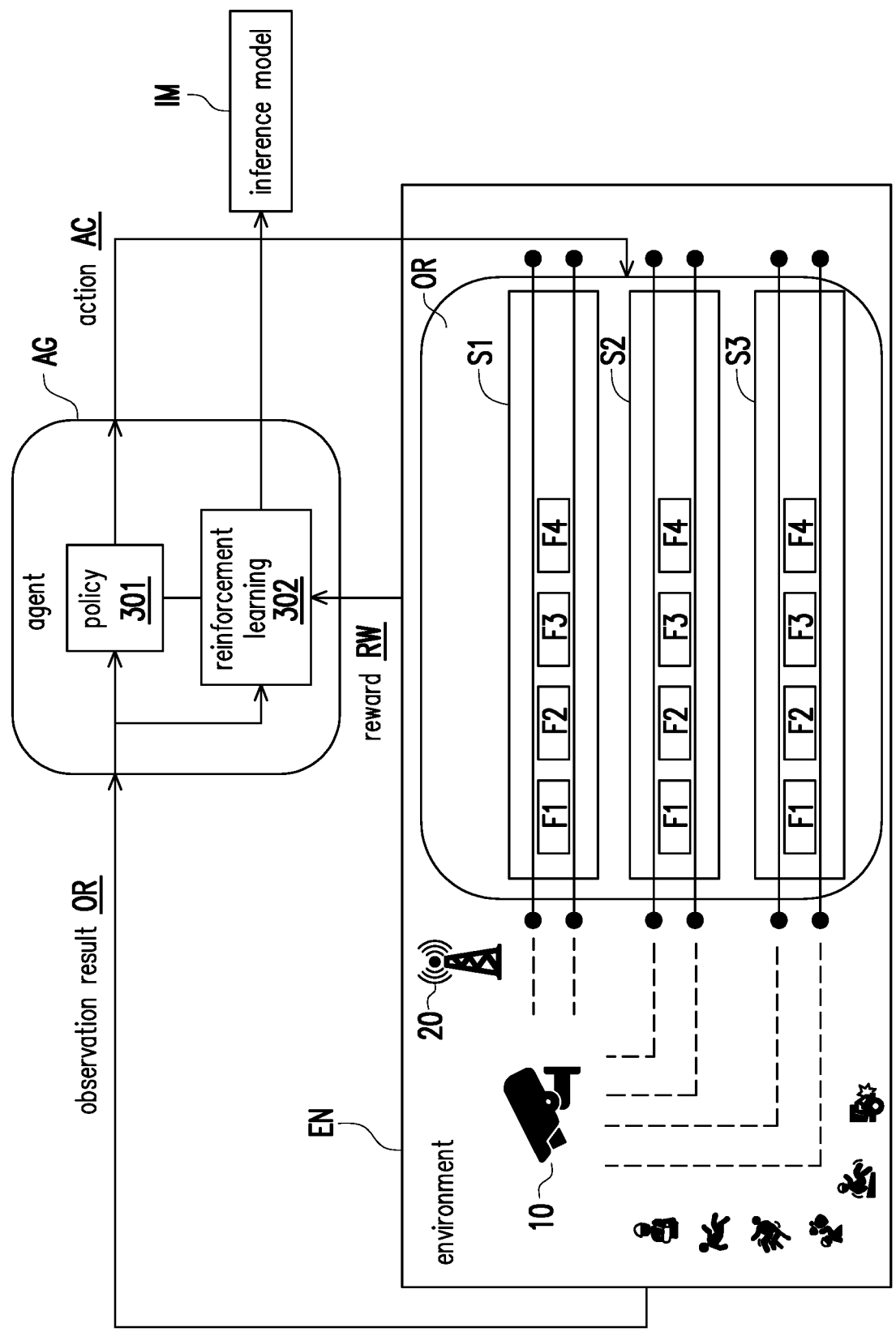
FIG. 3 is a schematic diagram of reinforcement learning according to an embodiment of the disclosure.

In one embodiment, the processor 33 may optimize/correct/modify the inference model using reinforcement learning. FIG. 3 is a schematic diagram of reinforcement learning according to an embodiment of the disclosure. Referring to FIG. 3, network slices S1, S2, and S3 correspond to the three stages of monitoring, insight, and enforcement, respectively. Reinforcement learning 302 may train an inference model IM through MLP (multilayer perceptron) or other machine learning algorithms, and may optimize the learning of the network resource corresponding to the network slices S1, S2, and S3 (i.e., the three stages) respectively, so as to determine parameter settings for function building of the network slices S1, S2, and S3 corresponding to the three stages.

The reinforcement learning 302 may repeatedly interact with a dynamic environment to learn to perform a task correctly. The processor 33 may define an environment EN. The environment EN includes the network slices S1 to S3 and a sensing network (e.g., the RAN where the base station 20 and the terminal device 10 are located). The sensing network may use the network resources provided by the network slices S1 to S3. That is, the terminal device 10 may access the sensing network with the bandwidth, latency, and/or priority limited by the network resources. In this way, the network entity 30 may obtain images from the terminal device 10 through the sensing network. In other words, the images may be accessed through the sensing network. Network functions F1 to F4 provided by the network slices S1 to S3 may be used to implement provision of the network resources, and are described in detail in the subsequent embodiment.

An operation of the reinforcement learning 302 relies mainly on data from the dynamic environment EN (data that may change with external conditions, such as time of day, weather, or traffic flow). A goal of a reinforcement learning algorithm is to find a policy that produces a best result. The reinforcement learning 302 may explore, interact and/or learn in the environment EN by means of an agent AG (implemented through software) and determine a conversion function (i.e., a policy 301) accordingly. An input of the policy 301 may include an observation result OR of the environment EN. The observation result OR is a state of the network slices S1 to S3. For example, the state of the network slice S1 in the monitoring phase is (1,0,0), the state of the network slice S2 in the insight phase is (0,1,0), and the state of the network slice S3 in the enforcement phase is (0,0,1).

An output of the policy 301 is an action AC. The processor 33 may input the observation result OR of the environment EN into the policy 301 to determine a setting parameter (i.e., the action AC) of the network resources provided by the network slices S1 to S3. The setting parameter includes hardware resources and/or the network resources provided by the network slices S1 to S3. The setting parameter is, for example, limitations on the use of processor, memory, and storage space (i.e., the hardware resource) for adjusting the network functions (e.g., User Plane Function (UPF)). Alternatively, the setting parameter such as routing path, bandwidth, QoS priority, forwarding path, or latency (i.e., the network resources) may be applied to a software-defined networking (SDN) controller to set up a network switch and/or a router.

In addition, the processor 33 may also be configured to determine the policy 301 (i.e., find the conversion function) according to a reward RW of the environment EN. By repeatedly executing the action AC and obtaining the corresponding observation result OR, the reward RW may be obtained. The reward RW is an evaluation of the setting parameter. If the reward RW is not as expected (e.g., less than a reward threshold), the reinforcement learning 302 continuously adjusts the policy 301. In addition, a network functions virtualization infrastructure (NFVI) and a SDN controller may determine the action AC (e.g., the setting parameter for the network slices S1 to S3) according to the policy 301 until a desired reward RW (e.g., greater than the reward threshold) is obtained. The final policy 302 will be a conversion function for the best network resource setting, and the processor 33 may use the conversion function to obtain the setting parameter for the network slices S1 to S3.

In one embodiment, the reward RW is an image specification corresponding to and/or an execution efficiency for the image using the network resources provided by the network slices S1 to S3. The image specification is, for example, image resolution or frame rate. The execution efficiency may be a detection rate at different stages. For example, an object detection rate in the monitoring phase, a context/event recognition rate in the insight phase, or a successful notification rate in the enforcement phase.

In one embodiment, a mathematical expression of the reward RW is:

$$\text{Reward}=(ODRm/\log(Rm*FPSm), CRRi/\log(Ri*FPSi), SARe/\log(Re*FPSe)) \quad (1)$$

where Reward is the reward RW, Rm, Ri, and Re are image resolutions of the monitoring, insight, and enforcement phases respectively, FPSm, FPSi, and FPSe are the required image resolutions of the monitoring, insight, and enforcement phases respectively, ODRm is the object detection rate of the monitoring phase, CRRi is the context/event recognition rate of the insight phase, and SARe is the successful notification rate of the enforcement phase. One of the reasons for taking the reciprocal of the logarithm is to achieve the maximum execution efficiency with minimum network resources.

One of goals of the reinforcement learning 302 is to find the policy 301 to get the most out of the reward RW. In terms of mathematical expression, a transition function is defined as 7C and $\pi(s)=a$, where s is the state (i.e., the observation result OR), and a is the action AC. One of the goals of the reinforcement learning 302 is to maximize $Q^\pi(s, a)$. $Q^\pi(\ )$ is a value-based optimization function. The maximization $Q^\pi(s, a)$ is also the one that determines a maximum value of a maximization function may be obtained in all policies 301. The optimization function is, for example, a Bellman function, and is obtained by iteration. For example, DQN (Deep Q-learning Network) in Q-learning (Q-tabl) inputs the observation result OR into a neural network, and outputs a Q value corresponding to the action AC for each row accordingly i.e., value function approximation. In short, during the execution of the reinforcement learning 302 by the processor 33, a table may be stored and used to record all actions AC executed in a particular state and resulting values (e.g., a value of $Q^\pi(s, a)$). The processor 33 may use the table to find a best action AC (which yields the maximum reward RW). In DQN, the design of a Q-Table is converted to use a neural network to learn. Through the learning of the neural network with different layers, a large number of features may be extracted from the environment CN to learn. In addition, Dueling DQN, Rainbow DQN or other algorithms may also be used to determine the policy 301.

Regarding the application of the reinforcement learning 302, firstly, an initial setting parameter corresponding to the network resources provided by the each of the network slices S1 to S3 may be generated through the network functions virtualization infrastructure and the SDN controller according to an initial policy 301 (i.e., the action AC). After a period of execution of the action AC and obtaining the observation result OR, the reward RW (e.g., the Reward of the aforementioned equation (1)) may be obtained. The processor 33 may decide whether to adjust the policy 301 according to the merits of the reward RW (e.g., compared with the reward threshold), and update the action AC accordingly. That is, an optimal transition function (i.e., the policy 301, e.g., the aforementioned $\pi$) is found through the reinforcement learning 302. Based on the policy 301, the setting parameter of the network resources in three states (e.g., the three phases of monitoring, insight, and enforcement corresponding to the network slices S1 to S3 respectively) may be determined, so that the system 1 may achieve the desired execution efficiency with the least amount of the network resources.

The processor 33 may issue commands that enable the network functions virtualization infrastructure and the SDN controller to use the setting parameters to generate and register the network functions F1 to F4 and network connection settings corresponding to the network slices S1 to S3 of different stages, and may enable the system 1 to operate under the settings. In one embodiment, the processor 33 may register newly generated network slices S1 to S3 to the core network to allow the network functions of the core network to recognize the network slices S1 to S3 and to switch between the network slices S1 to S3 accordingly.

Figure 4:
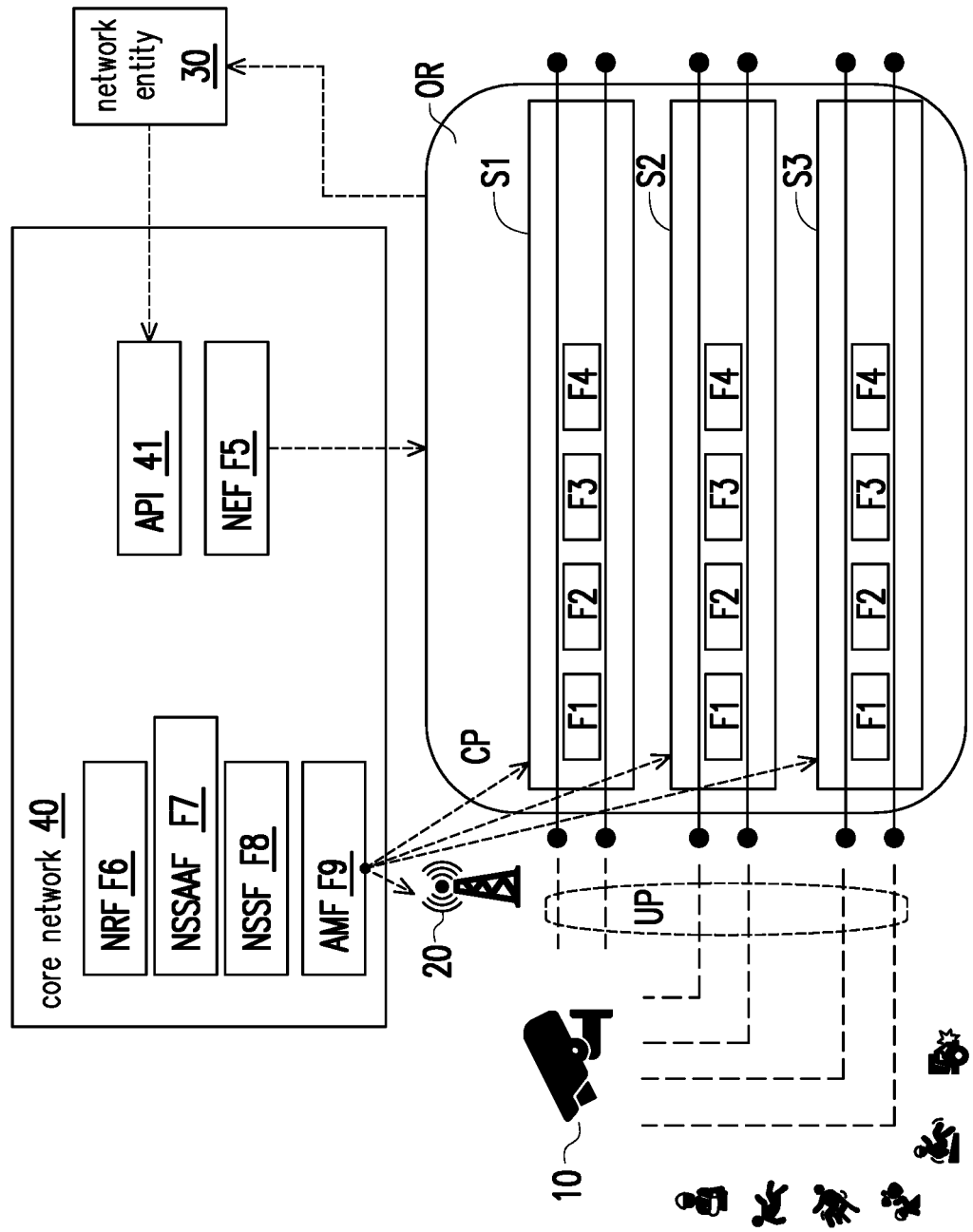
FIG. 4 is a schematic diagram of network slices of a core network according to an embodiment of the disclosure.

FIG. 4 is a schematic diagram of network slices of a core network 40 according to an embodiment of the disclosure. Referring to FIG. 4, the network function may be a network function F1 corresponding to a session management function (SMF), a network function F2 corresponding to a network repository function (NRF), a network function F3 corresponding to a policy control function (RCF), a network function F4 corresponding an user plane function (UPF), a network exposure function (NEF) F5, a NRF F6, a network slice specific authentication and authorization function (NS-SAAF) F7, a network slice selection function (FSSF) F8, and an access and mobility management function (AMF) F9. The network entity 30 may access some or all of the network functions through an application programming interface (API) 41.

The network slices S1 to S3 separate the network functions F1 to F4 from the core network 40 according to service requirements. According to 3GPP TS23.501, the network slices S1 to S1 are defined to be included in a public land mobile network (PLMN), including the core network 40 and a control plane CP and a user plane UP of the radio access network (RAN), and consist of a set of network functional elements (e.g., the network functions F1 to F4) that provide specific network capabilities and require different resources (e.g., computing, storage, networking, etc.).

Figure 5A:
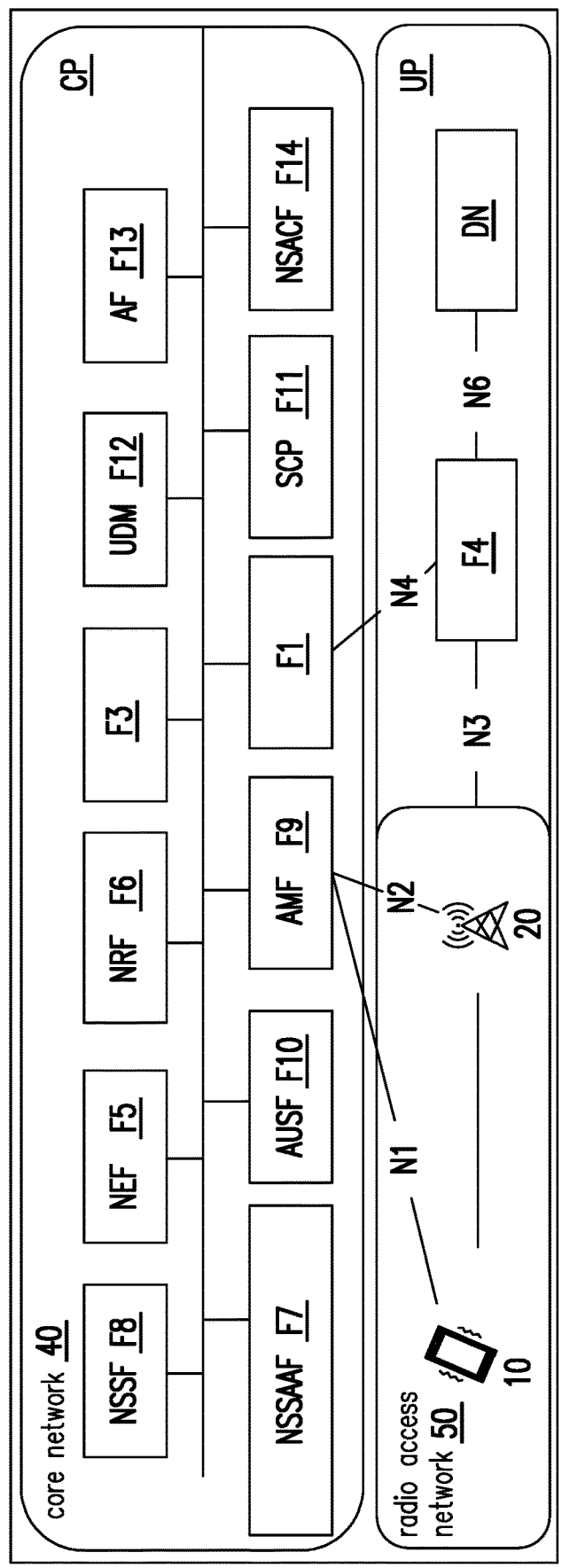
FIG. 5A is a schematic diagram of a network function of a core network according to an embodiment of the disclosure.

FIG. 5A is a schematic diagram of a network function of a core network 40 according to an embodiment of the disclosure. Referring to FIG. 5A, the core network 40 may include the network function F1 corresponding to SMF, the network function F3 corresponding to RCF, the NEF F5, the NRF F6, the FSSF F8, the AMF F9, an authorization server function (ASF) F10, a service communication proxy (SCP) F11, a unified data management (UDM) F12, an application Function (AF) F13, and a network slice admission control function (NSACF) F14 (belonging to the control plane CP). The user plane UP includes the network function F4 corresponding to UPF, a data network DN, a radio access network 50, and the terminal device 10. Connection points for the interaction between different network functions/elements are indicated by N1 to N4.

Based on network function virtualization and software-defined network (SDN) technologies (e.g., OpenStack, KBS, Openflow), network functions (elements) F1 to F4 corresponding to different resources (e.g., computing, storage, networking, etc.) may be generated in the existing mobile network environment by virtualizing the environment and using the software-defined approach. That is, the network functions F1 to F4 are generated by function virtualization and resources are allocated accordingly. When the network slices S1 to S3 are required, the network functions F1 to F4 are generated by the network functions virtualization infrastructure according to the service requirements, and the SDN controller controls parameters such as forwarding, routing, and switching to enable the network functions F1 to F4 to perform network transmission links and form the network slices S1 to S3 respectively.

Figure 5B:
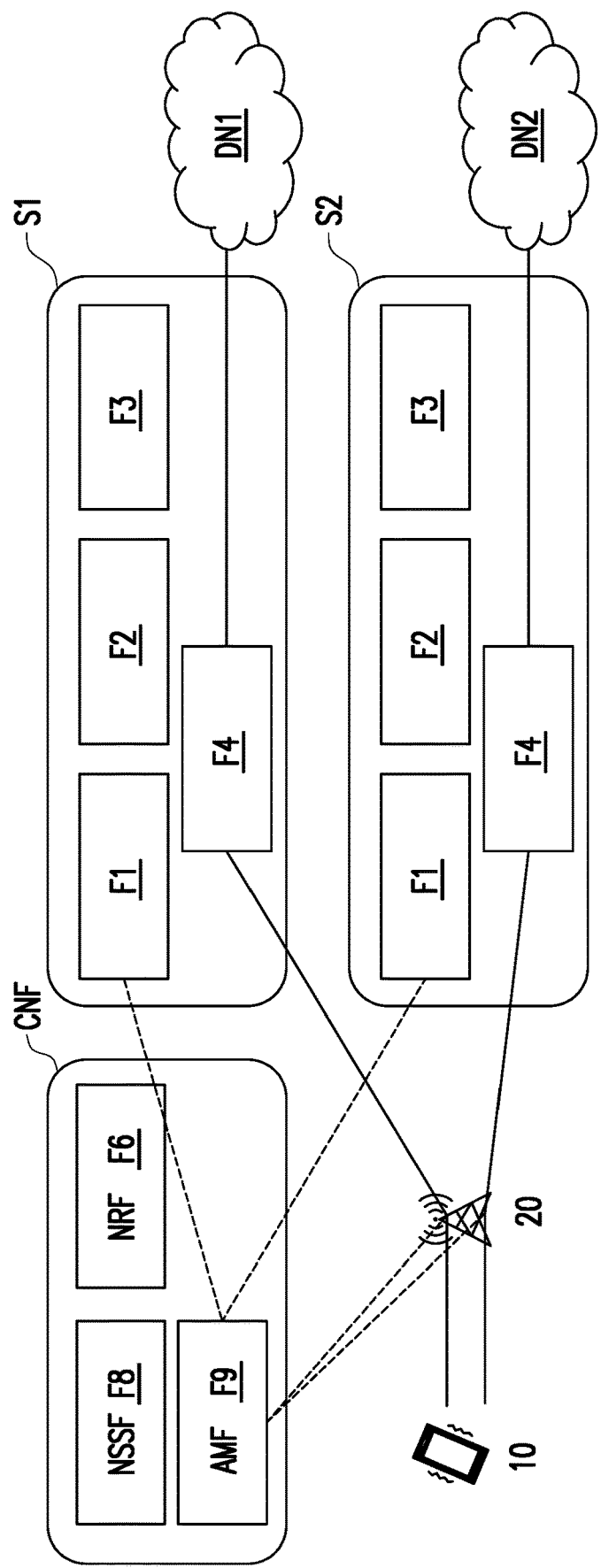
FIG. 5B is a schematic diagram of network slices of network functions according to an embodiment of the disclosure.

For example, FIG. 5B is a schematic diagram of network slices S1 and S2 of network functions F1 to F4 according to an embodiment of the disclosure. Referring to FIG. 5B, the network functions F1 to F4 are linked together, and two groups of the network functions F1 to F2 form the network slices S1 and S2 respectively (may correspond to different data networks DN1 to DN2, but not limited thereto). The core network may retain some of a general network function CNF (e.g., NRF F6, NSSF F8, and AMF F9).

It should be noted that the network functions and the network slices shown in FIG. 4, FIG. 5A, and FIG. 5B are only examples, and as communication technology evolves, networks in other generations may have different contents.

Then, after a network environment of the system 1 has been configured (e.g., for network functions and/or network connections), the processor 33 may perform multi-stage intelligent monitoring.

Figure 6:
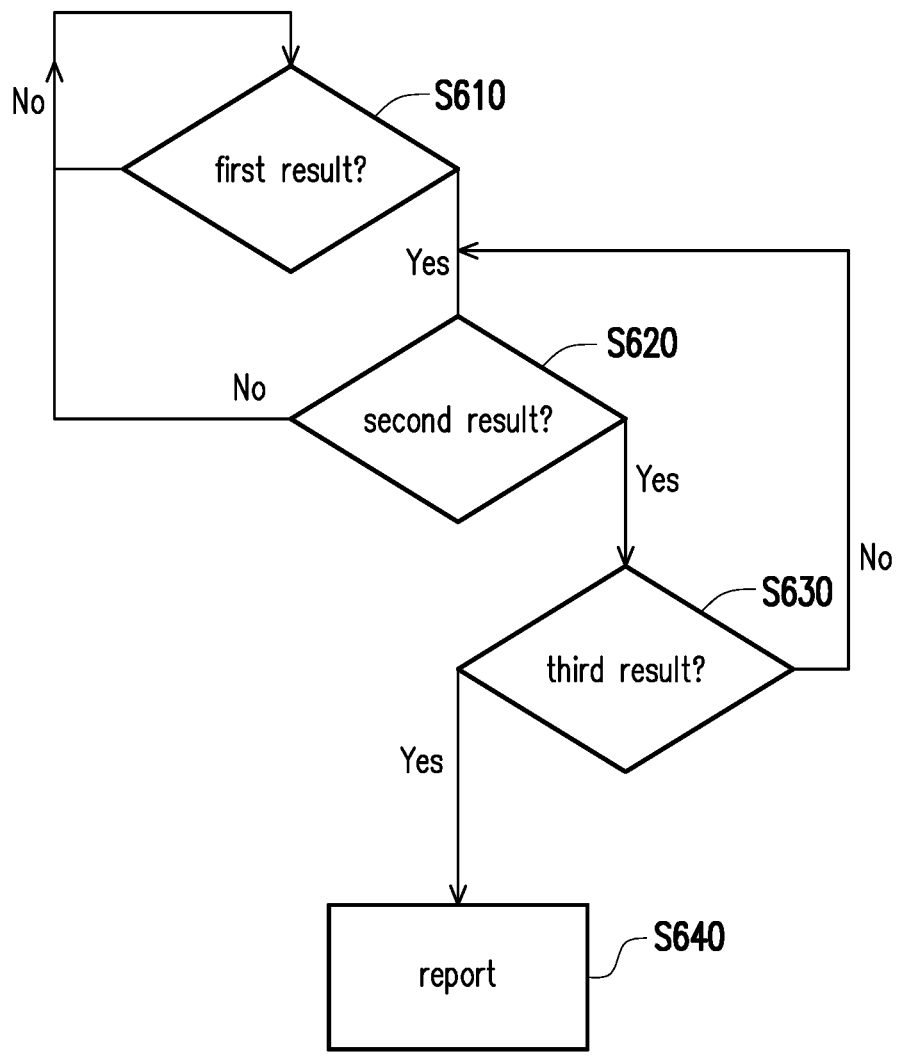
FIG. 6 is a flow chart of multi-stage intelligent monitoring according to an embodiment of the disclosure.

FIG. 6 is a flow chart of multi-stage intelligent monitoring according to an embodiment of the disclosure. Referring to FIG. 6, the processor 33 may define that the network resource provided by the network slice S2 is superior to the network resource provided by the network slice S1, and may define that the network resource provided by the network slice S3 is superior to the network resource provided by the network slice S2. For example, Table (1) shows the correspondence between the network slices S1 to S3 and the network resources (e.g., bandwidth and latency).

TABLE 1

| network slices | bandwidth | latency |
| --- | --- | --- |
| S1 | 1.32 Mbps (megabits per second) | 10 ms(milliseconds) or more |
| S2 | 5.84 Mbps | 1 ms~10 ms |
| S3 | 5.84 Mbps | 1 ms or more |

It should be noted that "superior" may mean greater bandwidth and/or less latency. However, the definition of "superior" may change depending on the content of the setting parameters.

The processor 33 may use the network resources provided by the network slice S1 (e.g., corresponding to the monitoring phase) and determine whether the detection result of the image is a first result (step S610). In one embodiment, the first result is the presence of the target object (e.g., a person, animal, vehicle, or weapon). One of main tasks in the monitoring phase is object detection. The monitoring image is usually kept in a still frame, so this phase requires a low image resolution (e.g., 1080P or 780P).

In response to the fact that the detection result is not the first result (e.g., the target object is not present), the processor 33 maintains the network environment in the network slice S1 and continues to determine whether the detection result is the first result (step S610).

In response to the detection result being the first result (e.g., presence of a target), the processor 33 may switch the network slice S1 to the network slice S2. For example, the processor 33 sends a command/request to the NEF of the core network through the communication transceiver 31 to ask the core network to switch to the network slice S2. In addition, the processor 33 may use the network resources provided by the network slice S2 (e.g., corresponding to the insight phase), and determine whether the detection result is a second result (step S620). In one embodiment, the second result is the occurrence of the target event (e.g., the target object is located in a no-parking zone, the target object is carrying a weapon, or the target object falls to the ground). One of main tasks in the insight phase is to analyze and deduct, and to identify if anomalies or critical conditions occur.

In one embodiment, an image specification required to detect the second result is higher than an image specification required to detect the first result. For example, Table (2) is the correspondence between network slices S1 to S3 and image specifications (e.g., image resolution and frame rate).

TABLE 2

| network slices | image resolution | frame rate |
| --- | --- | --- |
| S1 | 1920 × 1080 | 30 FPS (frames per second) |
| S2 | 4K | 60 FPS |
| S3 | 4K | 60 FPS |

That is, in addition to adjusting the resources, the network entity 30 may also set the image specifications of the images transmitted by the terminal device 10 to effectively utilize the resources.

In response to the fact that the detection result obtained by using the network resources provided by the network slice S2 is not the second result, the processor 33 may switch the network slice S2 to the network slice S1 and continue to determine whether the detection result is the first result (step S610).

In response to the detection result being the second result, the processor 33 may switch the network slice S2 to the network slice S3. For example, the processor 33 sends a command/request to the NEF of the core network through the communication transceiver 31 to ask the core network to switch to the network slice S3. In addition, the processor 33 may use the network resources provided by the network slice S3 (e.g., corresponding to the enforcement phase), and determine whether the detection result is a third result (step S630). In one embodiment, the third result is an occurrence of a target event (e.g., the target object is located in a no-parking zone, the target object is carrying a weapon, or the target object falls to the ground). In addition, in response to the detection result being the third result, the processor 33 also reports the third result through the communication transceiver 31 (step S640). In addition to analysis and deduction, the enforcement stage may also notify the occurrence of abnormal or critical conditions. For example, an on-site alarm is sent, and a message is sent to the relevant personnel to call for emergency response. Until the target event is removed (i.e., no target event occurs), the processor 33 switches back to the insight phase (e.g., switches to the network slice S2). Similarly, in response to the target event not being detected in the insight phase, the processor 33 switches to the monitoring phase (e.g., switches to the network slice S1).

It should be noted that the intelligent monitoring is not limited to the three phases, and the detection target of each of the phases is not limited to the detection of the target object and the event in the embodiment shown in FIG. 6.

To sum up, in the network management method according to the embodiment of the disclosure, the network slices are switched according to the detection result of the image, and the setting parameters of the network slices are optimized by using reinforcement learning, which may be applied to existing intelligent monitoring systems to dynamically adjust resources, thereby saving power and providing reliable network services.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. A network management method, comprising:
    obtaining a detection result, the detection result being a result of detecting an image;
    switching one of a plurality of network slices to another, according to the detection result, each of the network slices providing a network resource, and the image being accessed through the network resource, wherein the network slices comprise a first network slice and a second network slice, wherein the network resource provided by the second network slice is superior to the network resource provided by the first network slice;
    defining an environment, wherein the environment comprises the network slices and a sensing network, wherein the sensing network uses network resources provided by the network slices, and the image is accessed through the sensing network;
    inputting an observation result of the environment into a policy for determining a setting parameter of the network resources provided by the network slices, wherein a reward of the environment determines the policy, the observation result means the network slices, the policy is a transition function, and the reward is an evaluation of the setting parameter; and
    adjusting the policy according to the reward.

2. The network management method according to claim 1, wherein the step of switching one of the network slices to another, according to the detection result comprises: in response to the detection result being a first result, switching the first network slice to the second network slice; and using the network resource provided by the second network slice, and determining whether the detection result being a second result, wherein an image specification required for detecting the second result is higher than an image specification required for detecting the first result.

3. The network management method according to claim 2, further comprising:
    in response to the fact that the detection result obtained by using the network resource provided by the second network slice not being the second result, switching the second network slice to the first network slice.

4. The network management method according to claim 2, wherein the first result is presence of a target object, and the second result is an occurrence of a target event.

5. The network management method according to claim 2, wherein the network slices further comprise a third network slice, wherein a network resource provided by the third network slice is superior to the network resource provided by the second network slice, and the step of switching one of the network slices to another, according to the detection result comprises:
    in response to the detection result being the second result, switching the second network slice to the third network slice; and
    using the network resource provided by the third network slice, and determining whether the detection result being a third result.

6. The network management method according to claim 5, further comprising:
    in response to the detection result being the third result, reporting the third result.

7. The network management method according to claim 6, wherein the second result or the third result is an occurrence of a target event.

8. The network management method according to claim 1, wherein the reward is at least one of an image specification corresponding to the network resources provided by the network slices and an execution efficiency for the image.

9. The network management method according to claim 1, wherein the setting parameter comprises at least one of a hardware resource and the network resource.

10. A network entity, comprising:
    a communication transceiver, transmitting or receiving a signal;
    a memory, storing a program code; and
    a processor, coupled to the communication transceiver and the memory, and loading the program code for:
        obtaining a detection result through the communication transceiver, wherein the detection result is a result of detecting an image;
        switching one of a plurality of network slices to another, according to the detection result, wherein each of the network slices provides a network resource, and the image being accessed through the network resource, wherein the network slices comprise a first network slice and a second network slice, wherein the network resource provided by the second network slice is superior to the network resource provided by the first network slice;
        defining an environment, wherein the environment comprises the network slices and a sensing network, wherein the sensing network uses network resources provided by the network slices, and the image is accessed through the sensing network;
        inputting an observation result of the environment into a policy to determine a setting parameter of the network resources provided by the network slices, wherein a reward of the environment determines the policy, the observation result means the network slices, the policy is a transition function, and the reward is an evaluation of the setting parameter; and adjusting the policy according to the reward.

11. The network entity according to claim 10, wherein the processor: in response to the detection result being a first result, switches the first network slice to the second network slice; and uses the network resource provided by the second network slice, and determines whether the detection result being a second result, wherein an image specification required for detecting the second result is higher than an image specification required for detecting the first result.

12. The network entity according to claim 11, wherein the processor:
in response to the fact that the detection result obtained by using the network resource provided by the second network slice not being the second result, switches the second network slice to the first network slice.

13. The network entity according to claim 11, wherein the first result is presence of a target object, and the second result is an occurrence of a target event.

14. The network entity according to claim 11, wherein the network slices further comprise a third network slice, wherein a network resource provided by the third network slice is superior to the network resource provided by the second network slice, and the processor:
in response to the detection result being the second result, switches the second network slice to the third network slice; and
uses the network resource provided by the third network slice, and determines whether the detection result being a third result.

15. The network entity according to claim 14, wherein the processor:
in response to the detection result being the third result, reports the third result.

16. The network entity according to claim 15, wherein the second result or the third result is an occurrence of a target event.

17. The network entity according to claim 10, wherein the reward is at least one of an image specification corresponding to the network resources provided by the network slices and an execution efficiency for the image.

18. The network entity according to claim 10, wherein the setting parameter comprises at least one of a hardware resource and the network resource.

* * * * *